Figure 1:
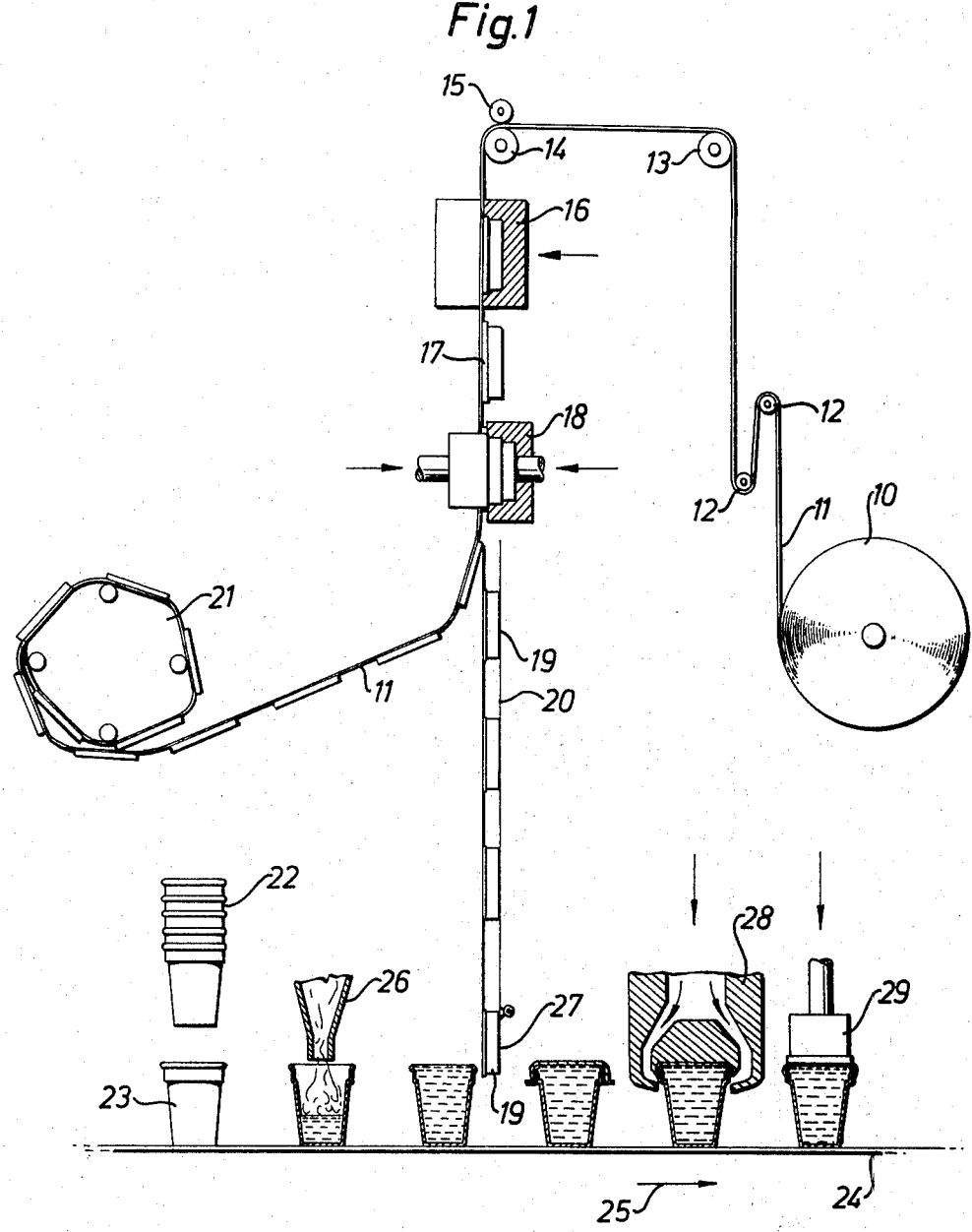

United States Patent [19]
Granseus et al.

[11] 3,862,816
[45] Jan. 28, 1975

[54] APPARATUS FOR MANUFACTURING CAPS OF A FOIL OF PLASTICS MATERIAL FOR SEALING CUPS, BOTTLES, JARS AND THE LIKE

[75] Inventors: Folke Evert Granseus, Vintrie; Klas Ingvar Helmer Borgstrom, Malmo, both of Sweden

[73] Assignee: Aktiebolaget Platmanufaktur, Malmo, Sweden

[22] Filed: Feb. 22, 1973

[21] Appl. No.: 334,810

[30] Foreign Application Priority Data
Feb. 24, 1972 Sweden................................ 2284/72

[52] U.S. Cl.................... 425/292, 425/398, 425/412
[51] Int. Cl.......................... B29c 3/00, B29c 17/08
[58] Field of Search ........... 425/292, 383, 412, 416, 425/DIG. 200, DIG. 201, 398, 423; 317/2 F

[56] References Cited
UNITED STATES PATENTS

| | | | |
|---|---|---|---|
| 1,169,428 | 10/1916 | Rogers | 317/2 F |
| 1,489,425 | 4/1924 | Chapman | 317/2 F |
| 3,105,270 | 10/1963 | Fibish | 425/145 |
| 3,161,915 | 12/1964 | Thiel | 425/388 X |
| 3,237,242 | 3/1966 | Gerletz | 425/DIG. 201 |
| 3,240,851 | 3/1966 | Scalora | 425/394 X |
| 3,605,192 | 9/1971 | Edwards | 425/292 X |
| 3,650,655 | 3/1972 | Santouris | 425/388 |

*Primary Examiner*—Robert L. Spicer, Jr.
*Attorney, Agent, or Firm*—Ladas, Parry, Von Gehr, Goldsmith & Deschamps

[57] ABSTRACT

An apparatus for manufacturing caps of a foil of plastics material for sealing cups, bottles, jars and the like comprises a mould cavity for forming a cupular body of the foil, clamping means being provided at the mould cavity to fixedly hold the foil during the forming in order to obtain a stretching of the foil material. The apparatus also includes punching means for cutting off the cupular body or a portion thereof from the foil.

7 Claims, 6 Drawing Figures

APPARATUS FOR MANUFACTURING CAPS OF A FOIL OF PLASTICS MATERIAL FOR SEALING CUPS, BOTTLES, JARS AND THE LIKE

The present invention relates to an apparatus for manufacturing caps for sealing cans, cups, bottles, jars and the like.

It is previously known to produce caps of a foil of plastics material which is bi-axially pre-oriented. However, the process involved is expensive, and the cap obtained thereby does not give sufficient reliability in sealing the cup or the like.

An object of the invention is to provide an apparatus which makes it possible to use a less expensive plastics material such as an ordinary non-oriented foil of PVC, polyethylene or polypropylene or another similar foil orientable by stretching, a controlled orientation of the plastics material being achieved by forming the caps.

Another object of the invention is to provide an apparatus of the kind referred to for producing caps which may be applied to the cup or the like by shrinking and which provide a reliable sealing of the cup or the like without formation of folds or creases or perviousness ensuing therefrom.

A further object of the invention is to provide an apparatus of the kind referred to which produces from a web of a foil of plastics material caps for sealing cups or the like and which may be associated with a filling machine at the place where the filling of the cups takes place.

A still further object is to provide an apparatus of this type which may be co-ordinated with a modern high speed filling machine to deliver the caps at a rate commensurate with the rate at which the filled cups are delivered from the filling machine.

In order to obtain these and other objects the invention provides an apparatus for manufacturing caps of a foil of plastics material for sealing cups, bottles, jars and the like comprising moulding means providing a mould cavity which has a bottom and a side wall, means for fixedly clamping the foil around the cavity, means for stretching the clamped foil in the mould cavity to form thereof a cupular body having a bottom and a side wall and having a controlled orientation of the molecules of the plastics material therein, and means for cutting off at least the clamped portion of the foil from the cupular body thus formed.

Figure 2:
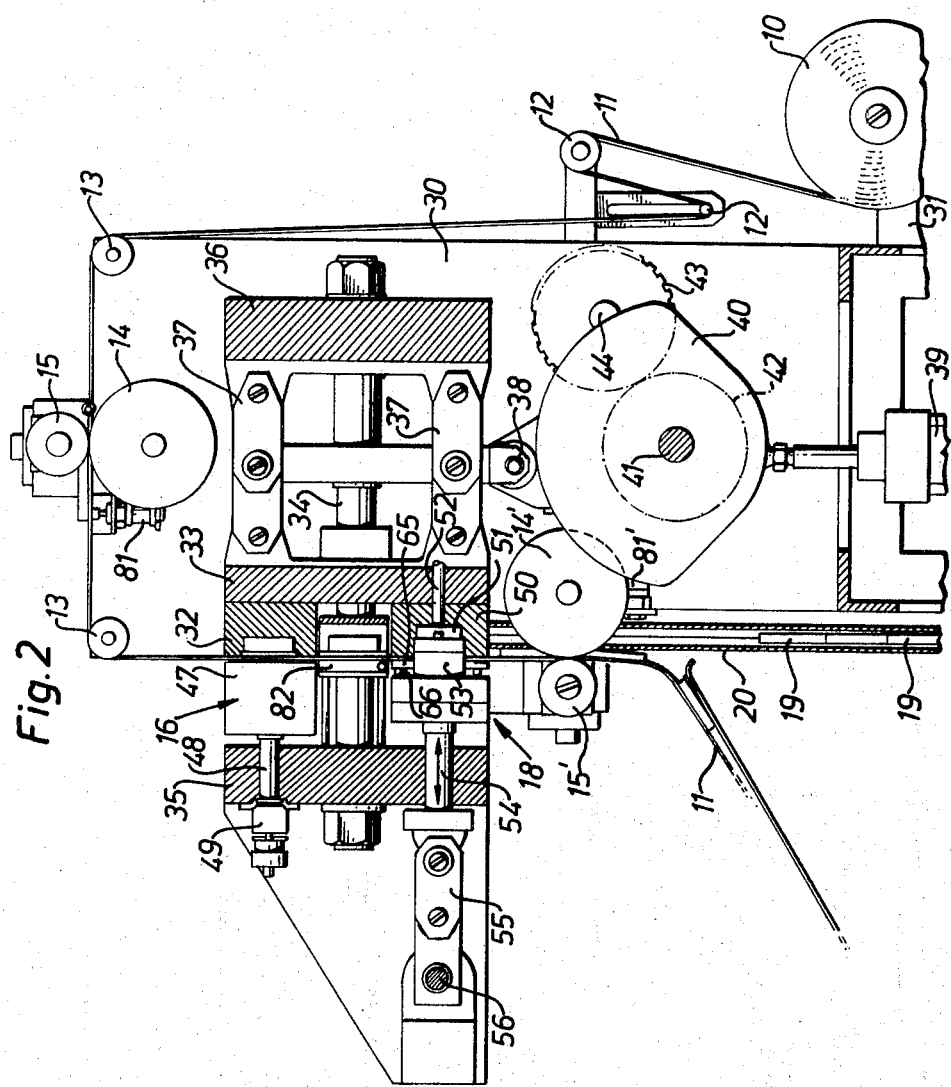
Figure 3:
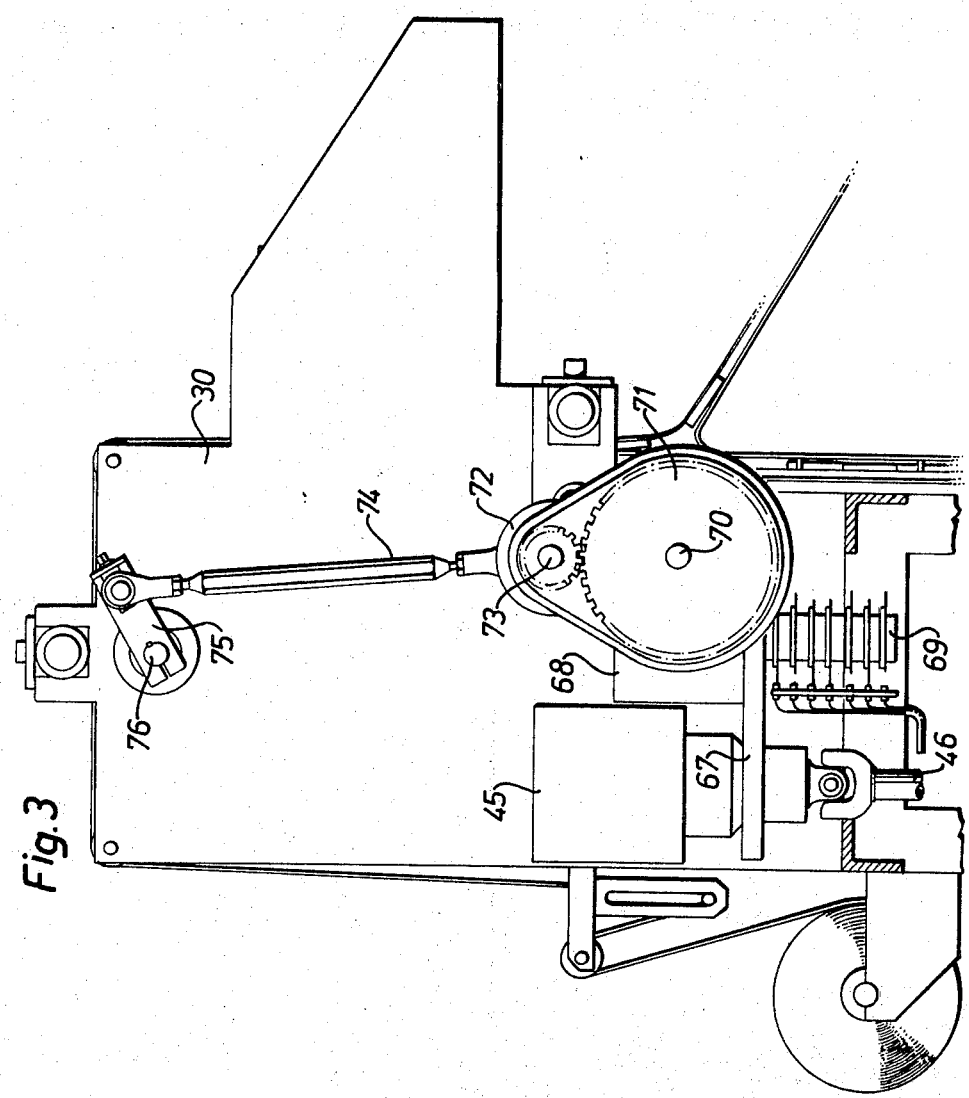
Figure 4:
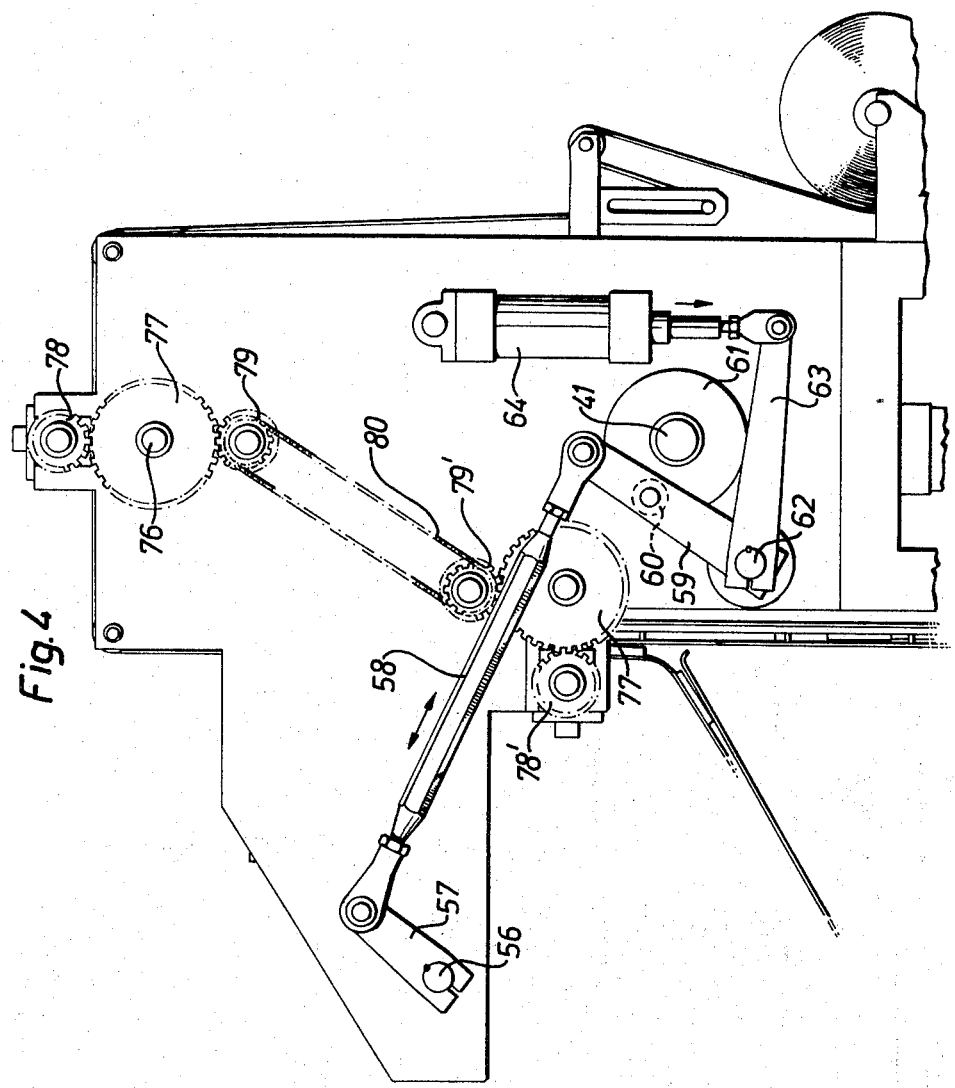
Figure 5:
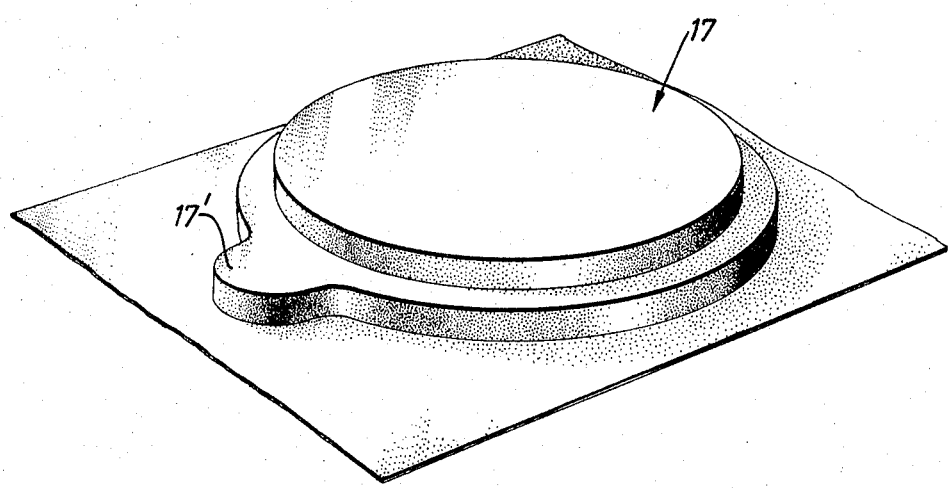

The invention will be described in greater detail in the following with reference to the accompanying drawings, in which FIG. 1 is a diagrammatic view for setting forth the apparatus according to the invention as well as associated stations for filling and sealing cups, FIG. 2 is a side elevational view of an upper portion of the apparatus according to the invention showing the moulding and punching means, FIG. 3 is a side elevational view of the apparatus showing parts of the driving mechanism of the apparatus, FIG. 4 is a view corresponding to FIG. 3 of the apparatus as seen from the opposite side, showing other parts of the drive mechanism of the apparatus, FIG. 5 is a perspective view of the foil of plastics material formed with a cupular recess in the apparatus in FIGS. 1 to 4, and FIG. 6 is a perspective view of a cap obtained from the cupular recess disclosed in FIG. 5.

FIG. 1 shows diagrammatically a storage roll 10 of a web of plastics material such as an ordinary non-oriented foil of PVC, polyethylene or polypropylene, or another similar foil orientable by stretching. From said storage roll the web 11 is withdrawn over guide rollers 12 in a looper to a guide roller 13 and a feed roller 14, the latter of which is associated with a counter-pressure roller 15 which is mounted to be raised. From feed roller 14 web 11 is drawn through a moulding tool 16 for providing a cupular recess 17 in the web, and a punching tool 18 for punching off a cap 19 from the cupular body formed by the recess. The cup thus formed drops into a vertical feeder shaft 20, while the web 11 is deflected sideways and wound up on a reel 21.

The counter-pressure roller 15 is raised from the feed roller 14 during the closing movement of the moulding and punching tools in order that the web may be freely movable when these tools operate, so that the cupular recess may be easily guided into the die cavity of the punching tool. Web 11 is intermittently fed from the storage roll 10 to the reel 21 timed with the movements of the moulding and punching tools.

From a store 22 cups 23 are dispensed one at a time and placed on a conveyor 24 which is intermittently moved in the direction of the arrow 25. This is done in such a way that the cups arranged in a row on the conveyor are moved one by one through a number of stations distributed along the conveyor, the spacing of which corresponds to the motion steps of the conveyor during the intermittent movement thereof. In a filling station 26 the cup is filled with a liquid or other material to be packaged therein, whereupon the cup is moved past the lower end of the feeder shaft 20, said end being provided with a cap dispenser 27 by means of which a cap 19 is dispensed from the shaft and dropped over the cup when the cup is moving past the dispenser below the lower open end thereof. The cup provided with a cap loosely resting thereon then is moved to a first shrinking station 28 where the marginal portion of the cap is shrunk onto the cup whereupon the cup is carried to a second shrinking station 29 where the plane top side of the cap is shrunk.

In the constructive embodiment shown in FIGS. 2 to 4, two guide rollers 13 are disposed each on one side of the feed roller 14, as shown in FIG. 2. Furthermore, an additional feed roller 14' and an associated counter-pressure roller 15' are disposed after the moulding and punching tools 16 and 19, respectively. The guide and feed rollers are journalled in a frame 30 which also carries the counter-pressure rollers 15, the looper guide rollers 12 and the storage roll 10, the latter of which being journalled in a yoke 31.

The moulding tool 16 comprises a mould 32 for moulding the cupular recess (the cap) by pressure and/or vacuum. As will be seen from FIG. 2 the cavity of mould 32 has two cylindrical side wall portions of different diameters, an inner one of a small diameter adjacent the bottom of the cavity and an outer one of a large diameter adjacent the opening of the cavity. The inner and outer side wall portions are interconnected by a shoulder. The mould is supported by a movable tool plate 33 which is displaceably guided on a pair of bars, one of which is shown at 34. Said bars are connected with sturdy stationary plates 35 and 36 in the frame. By means of a double toggle lever mechanism 37 the movable tool plate is connected with plate 36. The toggle means is provided with a cam follower 38 which by a pneumatic cylinder 39 is kept engaged with a cam disk 40 mounted on a shaft 41. Said shaft by means of a gear wheel 42 is connected to a gear wheel 43 on a shaft 44 which is the output shaft of an angle gear 45, FIG. 3, the input shaft of which is shown at 46 and is coupled to an electric drive motor not shown.

For cooperation with mould 32 an abutment 47 is provided on plate 35, said abutment being supported by a shank 48 axially displaceable in plate 35 and movable against a spring load 49 towards the left with respect to FIG. 2. Said abutment is constructed as a heating plate and can be applied to an annular portion of the mould 32 surrounding the mould cavity thereof. As a result of the reciprocation of the tool plate by means of toggle mechanism 37 mould 32 is alternatingly moved towards and away from abutment 47, and when it is moved towards the abutment said abutment is applied against the mould while the spring load 49 yields to a certain degree, the web 11 extending between the mould and the abutment being squeezed around the mould cavity. In a conventional manner the mould cavity can be placed under a certain pressure above or below atmospheric by means not shown in detail here, in order that the web may be pressed or drawn into the mould cavity and be shaped according to it, the web being softened in order to facilitate its shaping by heating thereof by means of the abutment constructed as a heating plate.

When the cupular recess is being formed in the cavity of mould 32, the web being clamped around the cavity thereof, the plastics material of the web will be stretched and a controlled orientation of the molecules of the plastics material will be obtained. This means that the cupular recess formed will have a radial and tangential orientation of the molecules from the centre of the bottom of the cupular recess towards the peripheral portions thereof the stretching being concentrated to the peripheral portion of the cupular recess. A portion of the web and the cupular recess 17 formed therein is disclosed in FIG. 5 the shape of the recess following the shape of the cavity of mould 32. The recess may be formed with a projecting portion 17' at the periphery thereof for a purpose to be described.

Tool plate 33 furthermore carries a die 50 having a cavity fitting the cupular recesses 17 and in which there is disposed an ejector 51 which is stationarily anchored in the frame 30 of the machine by means of a shank 52. Said ejector occupies the position according to FIG. 2 in contact with the bottom of the die cavity when tool plate 33 is in its left-hand end position but is displaced out of the die cavity in relation to the die when the tool plate moved towards the right with respect to FIG. 2 during the reciprocating motion of the tool plate produced by means of toggle mechanism 37. In shank 51 there may be provided a venting line from the die cavity to the surrounding atmosphere. For cooperation with the die there is provided a punch 53 which is carried by a reciprocable bar 54 passing through plate 35. The said bar by means of a simple toggle mechanism 55 is connected with a shaft 56 to which an oscillating movement is imparted by means of a transmission shown in greater detail in FIG. 4. On shaft 56 there is disposed an arm 57 which by means of a connecting rod 58 is connected with a cam follower 59 having a rotatably mounted roller 60 for cooperation with a cam disk 61. Said cam follower is pivotally mounted by means of a shaft 62 with which it is non-rotatably connected, and on the same shaft there is non-rotatably mounted a second arm 63 coupled to a pneumatic cylinder 64. Due to the fact that said cylinder is put under pressure for exerting a downward force on its piston rod the cam follower 59 is kept engaged with cam disk 61 at roller 60 under a pressure determined by the air pressure in the cylinder. The compressibility of the air permits the cam follower to follow the motion determined by the cam path on the cam disk, and it will be seen that said cam path largely is circular although it has a plane portion occupying approximately one third of the periphery of the cam disk. Thus, due to the rotation of the cam disk the connecting rod 58 has a reciprocating motion imparted to it and consequently an oscillating motion 13 imparted to shaft 56, implying that punch 53 has a reciprocating motion imparted to it through toggle means 55 and bar 54. The cam disk is disposed on shaft 41 and its rotation is consequently positively connected with the rotation of cam disk 40, which means that the movement of tool plate 33 and the movement of punch 53 always take place in a predetermined mutual relationship.

On punch 53 there is provided a conical guiding and holding member 65 in the form of a ring surrounding the punch, said ring being supported by a pin 66 by means of which the holding means is axially displaceably guided on the punch, the holding means being movable against spring action towards the left with respect to FIG. 2. Now the relation between the movements of tool plate 33 and punch 53 is such that the following course of movement is obtained: when tool plate 33 moves towards the left with respect to FIG. 2, die 50 is displaced towards the left while moving towards the left in relation to ejector 51 so that the die and the ejector after completing the movement will occupy the position according to FIG. 2. During this movement punch 53 is in a retracted position but is now moved towards the right by means of its driving mechanism, whereby member 65 will first come into contact with die 50 in order that web 11 may be firmly squeezed between the die and the holding means in an annular squeezing zone surrounding the die cavity. The pressure is obtained through the displacement of member 65 in relation to the punch against spring action. At the continued movement of the punch towards the right into the die cavity the cupular recess 17 formed by the web is punched off from the web by cooperating edges on the punch and the die, the punched-off portion of the web, the cap, being moved into the die cavity. At the return of the punch the cap remains in the die cavity. Member 65 releases its grip on the web and when the die then is moved back through the movement of tool plate 33 towards the right, the cap 19 will be ejected from the die cavity by the ejector 51 and will drop into shaft 20.

Figure 6:
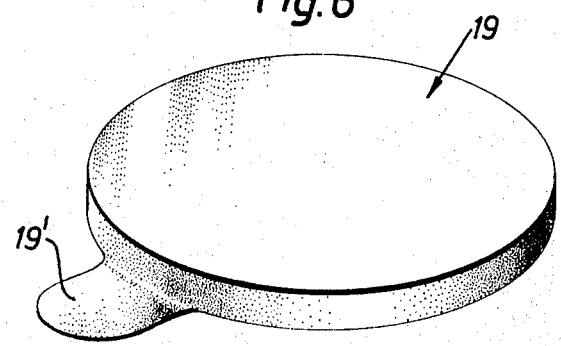

Cap 19 formed in the apparatus described and supplied to shaft 20 has the form disclosed in FIG. 6. The shoulder portion forming part of projection 17' of the cupular recess 17 in FIG. 5 provides a tearing flap 19' on the cap. This flap is formed by a highly stretched portion of the foil from which the cap is made, and this means that during shrinking of the cap on a cup or the like the flap will be put into tight contact with the outer surface of the side wall of the cup or the like due to shrinking. As will be understood the cap may be made without having a tearing flap.

Web 11 must be stepwise advanced in timed relationship with the movements of tool plate 33 and punch 53 and this movement as well therefore is produced from input shaft 46 by means of the transmission shown in FIG. 3. A gear transmission 67 connects input shaft 46 with an indexing gear case 68 and a programming means 69 for operating these two units in synchronism with angle gear 45. The gear case has an output shaft 70 which is connected with a gear transmission through a crank disk 72 on a shaft 73, and the crank disk in turn is connected by means of a connecting rod 74 to a crank arm 75 on a shaft 76, said crank arm being connected with its shaft by means of a one-way coupling 75' of such a kind that the crank arm will drive the shaft in a clockwise direction with respect to FIG. 3 but will be disconnected from the shaft at the counter-clockwise movement. On shaft 76 there is disposed a gear wheel 77 — see FIG. 4 — which is in engagement with a gear wheel 78 on the web feed roller 14 and with a gear wheel 79 which by means of a chain transmission 80 is connected to a similar gear wheel 79', which in turn is in engagement with a gear wheel 77', which is similar to the gear wheel 77 and engages a gear wheel 78' on the web feed roller 14', which is similar to gear wheel 78. This means that the web feed rollers are interconnected for synchronous operation from shaft 75.

In order to operate shaft 76 connecting rod 74 has a reciprocating motion imparted to it from indexing gear case 68 by means of crank disk 72. The downward stroke in that connection is the operative stroke and is performed at the moment when tool plate 35 is retracted to the right as seen in FIG. 2 in order to pull the web forward one step corresponding to the pitch between the cupular recesses 17 formed. During this operative stroke web feed rollers 14, 14' therefore will drive web 11 and this is accomplished by the counter-pressure rollers 15, 15' being kept in contact with the web feed rollers in order to press the web against them. In order to raise the counter-pressure rollers when the web is to be released pneumatic cylinders 81 and 81' are connected to the counter-pressure rollers and said cylinders are supplied with pressurized air for raising the counter-pressure rollers in response to the controlling action of the programming means 69.

Between abutment 47 and punch 53 there is provided on plate 35 a so-called antistatic means 82 for leading off static electricity from the web passing through the two processing stations so that the caps will not receive a static charge which could cause them to adhere to the walls of shaft 20 whereby the caps could become stuck therein.

What we claim is:

1. An apparatus for manufacturing caps of foil of plastics material for sealing cups, bottles, jars and the like comprising moulding means providing a mould cavity having a bottom and a side wall which has two essentially cylindrical side wall portions a narrow portion adjacent the bottom and a portion wider than the narrow portion and being remote from the bottom and joining the narrow portion at a shoulder;

means for fixedly clamping the foil around the mould cavity;

means for stretching the clamped foil in the mould cavity to form thereof a cupular body having a corresponding narrow side wall portion adjacent the bottom of the body and a side wall portion wider than the narrow portion and being remote from the bottom and joining the narrow side wall portion at a shoulder, and means for controlling the orientation of the molecules of the plastics material therein; and means for cutting off both the bottom portion of the cupular body from said side wall portion and a part of the shoulder.

2. An apparatus as claimed in claim 1, further comprising means for stepwise feeding a web of the foil of plastics material, the moulding and punching means being located along the web of material, means associated with the punching means for aligning the cupular body formed by the moulding means with said punching means, and means for releasing the web of material from the feeding means during the moulding and punching operations in order that the web may be freely movable during the moulding and punching operations.

3. An apparatus as claimed in claim 2, further comprising a mould and a die, forming part of the moulding and punching means, respectively, and a common tool plate supporting the mould and the die for movement towards and away from the web of material on one side thereof.

4. An apparatus as claimed in claim 3, further comprising at the opposite side of the web of material a heating plate and a holding member for cooperation with the mould and the die, respectively, the web of material being pressable against the heating plate and the holding member, respectively, when the mould and the die, respectively, are applied to the web of material.

5. An apparatus as claimed in claim 2, further comprising between the moulding and the punching means a device for leading off static electricity from the web of material.

6. An apparatus as claimed in claim 2, wherein the feeding means comprises at least one driven feed roller, a pressure roller biassed against the feed roller for pressing the web of material against the feed roller, and means for raising the pressure roller from the feed roller to release the web of material from the feeding means.

7. An apparatus as claimed in claim 2, further comprising a shaft for discharging the caps formed in a row one by one, and means for discharging and winding up the remaining web of material.

* * * * *